United States Patent [19]

Partridge

[11] 4,364,800
[45] Dec. 21, 1982

[54] SITU METAL PLATING OF THE CATHODE TERMINAL SURFACE OF AN ELECTROCHEMICAL CELL

[75] Inventor: Alan H. Partridge, Horshan, England

[73] Assignee: Duracell International Inc., Bethel, Conn.

[21] Appl. No.: 218,223

[22] Filed: Dec. 19, 1980

[30] Foreign Application Priority Data

May 23, 1980 [GB] United Kingdom ................ 8017192

[51] Int. Cl.$^3$ .......................... C25D 5/02; C25D 5/34
[52] U.S. Cl. .................................. 204/15; 204/32 R; 204/38 R
[58] Field of Search ..................... 204/15, 32 R, 38 R, 204/248

[56] References Cited

U.S. PATENT DOCUMENTS 3,066,084 11/1962 Osterman, Jr. ..................... 204/248
3,389,060 6/1968 Greene ............................... 204/248
3,880,730 4/1975 Wright ............................... 204/248
4,287,031 9/1981 Good .................................. 204/109

FOREIGN PATENT DOCUMENTS 15383 of 1899 United Kingdom ................ 204/249

*Primary Examiner*—T. Tufariello
*Attorney, Agent, or Firm*—Ronald S. Cornell; Israel Nissenbaum

[57] ABSTRACT

A process for plating a metal, preferably gold, onto the exposed surface of a cathode terminal of an electrochemical cell. The cell is contacted with a solution containing the metal ions to be plated thereon. The cell is then permitted to self-discharge through the solution for a given period of time which causes the metal to plate out, at a given thickness, onto the surface of the cathode terminal in contact with the solution. In a preferred form, the process includes the steps of first activating the surface of the terminal by contacting it with a solution containing hydroxide ions.

10 Claims, No Drawings

SITU METAL PLATING OF THE CATHODE TERMINAL SURFACE OF AN ELECTROCHEMICAL CELL

FIELD OF THE INVENTION

This invention relates to the metal plating of a cathode terminal of an electrochemical cell, and more particularly to a process for the in situ plating of a metal onto the exposed surface of a cathode terminal of an electrochemical cell using its own discharge current to cause the metal plating to occur.

BACKGROUND OF THE INVENTION

The terminals of an electrochemical cell are normally low in electrical resistance, high in corrosion resistance, aesthetically appealing, resistant to mechanical failure and inexpensive. Such varied qualities cannot generally be achieved by the use of a single metal or metal alloy.

Metals possessing good corrosion resistance and aesthetic appeal are expensive and generally possessed of mechanical properties unacceptable in cell terminals. Those inexpensive metals formable into cell terminals of the desired mechanical properties, are generally of poor corrosion resistance and lack aesthetic appeal.

Terminals having the desired properties can be made by coating a thin layer of an expensive, corrosion resistant metal onto a low cost base metal of desired mechanical properties. An example of the use of metal plating in electrochemical cells is found in button cells which are used in watches, hearing aids and the like. The cathode terminals of many such cells are shaped steel members plated with a thin layer of gold or other highly corrosion resistant metal. The gold imparts the desired corrosion resistance and low electrical resistance, and generally improves the aesthetic appearance of the cells.

The recent dramatic increases in the price of gold and of the other metals useful as a cover layer for a cell terminal have caused plated terminals to become increasingly expensive to manufacture. Obvious methods of reducing manufacturing costs are not useful. Costs cannot be reduced simply by decreasing the thickness of the plated metal, since a reduction from the presently used thickness results in a substantial loss of the desired properties imparted by the plated metal. Modern plating processes are otherwise quite efficient and have heretofore not been modifiable to reduce the quantity of metal consumed in plating the terminals.

THE INVENTION

A new process has now been discovered that reduces the quantity, by about fifty percent, of the gold heretofore used to plate the surface of a cathode or negative terminal of a cell. In the newly discovered process, the cell is assembled in a conventional manner but using an unplated cathode terminal. The assembled cell is then contacted with a solution containing gold in a plateable form. The cell discharges through the plating solution, causing the gold to plate out onto only the exposed surface of the cathode terminal.

The new process reduces gold consumption by at least fifty percent by plating gold onto only the surface of the cathode terminal that is exposed to the plating solution. Plating processes used heretofore plated all surfaces of the cathode terminal including that portion which was subsequently in contact with only the interior portions of the cell, even though the desirable properties of the gold plating were only effective on the exposed surface of the cathode terminal. The advantages of fully plated cathode terminals have been observed in cells manufactured with cathode terminals having only the exposed surface gold plated.

Further quantities of gold are saved by the new process in that no gold plates out onto the terminals of inactive or poor cells. Such cells do not generate sufficient electric current to effect plating. Further, as a result of plating the cathode terminal after cell assembly, no cathode terminals or their plated surfaces are damaged by handling during cell manufacture. Previously, terminals were subject to several manufacturing steps after plating and some terminals were damaged thereby. The gold plated thereon was lost and could not be reclaimed except by expensive processes.

Although the use of gold in the process of the present invention is preferred, the process as disclosed and described herein is not limited to gold. Other metals which have been electroplated in the past can also be electroplated onto the cathode terminal of an electrochemical cell through use of the method of the present invention. Such other metals include silver, copper, nickel and chromium.

DESCRIPTION OF THE PREFERRED EMBODIMENTS

In a preferred embodiment of the process of the present invention, a cell is conventionally manufactured, employing an unplated cathode terminal. The exposed surface of the cathode terminal is then preferably cleaned and activated prior to being contacted with a plating solution.

Cleaning of the cathode terminal surface can be accomplished in any of the methods known in the art. The preferred cleaning method employs an emulsifiable solvent cleaner, such as Solvex ICS 400 sold by Burmah-Castrol Inc., Edison, N.J., in an ultra-sonic cleaning tank. Such cleaners and cleaning methods are well known in the art.

Activation of the surface of the cathode terminal prior to plating can be accomplished after or instead of cleaning. In a preferred method of activation, the surface of the cathode terminal is contacted with an activating solution. The solution removes most foreign substances and most oxide layers adhering to the cathode terminal, providing a surface to which the plated metal can better adhere. This process is assisted by the electrical energy of the cell using the principle of cathodic cleaning and activation.

The activating solution is preferably basic, i.e., containing hydroxide ions. Acid solutions may irreversibly affect the terminals and cell. Preferred basic activating solutions include aqueous solutions of potassium carbonate, potassium hydroxide, and sodium hydroxide. Other well known bases, which can effectively activate the surface of the cathode, are also useful.

A wetting agent, such as one of the many surfactants well known in the art, can also be added to the preferred activating solution. Such agents act to improve the process of activation of the surface of the cathode terminal.

The surface of the cathode terminal is plated by contacting the cell with a plating solution. Metal plating occurs as the cell discharges through the conductive metal plating solution. The plating solution is generally rendered conductive by the presence of metal ions and other ionic solutes.

As the cell discharges, the positive metal ions in the plating solution migrate toward the negative or cathode terminal of the cell. The metal ions are reduced at the cathode terminal surface and plate out thereon. The quantity of gold plated out onto the cathode terminal surface will vary with the length of time the cell is in contact with the solution, the temperature of the solution, the quantity of current generated by the cell, and other factors well known in the art.

The voltage required for the deposition of gold and other metals in the process of the present invention varies, but it is generally from less than one volt to less than five volts. Most electrochemical cells can produce the voltage needed for plating and thus the process of the present invention can be used with most cells. One skilled in the art knowing the voltage of the cell to be plated and the deposition voltage required for the various solutions of each metal, can easily select the proper solution for plating any given metal onto a desired cell terminal by the process of the present invention.

In the process of the present invention, metal plates out only onto the portions of the cathode terminal surface in contact with the plating solution. No metal can plate on the other portions of the cathode terminal surface, such as those portions in contact with the interior of the cell, or with the cell seal. Metal will not plate out onto the anode or positive terminal, due to the nature of the electroplating process. Further, no metal can plate out onto the cathode terminals of weak or inactive cells, due to their inability to produce a voltage sufficient to reduce the metal ions. The above recited features of the present invention result in a saving of metal consumed per cathode terminal as compared to previously known processes wherein all surfaces of the cathode terminal were plated.

The plating solutions employed in the present invention are preferably efficient in plating gold on the cathode terminal and preferably contain negative ions which do not adversely react with the anode terminal of the cell or generate undesirable by-products during cathode terminal plating. A preferred plating solution meeting these criteria is a basic solution of a sulfite complex of gold which meets the requirements of Military Specification MIL-G-45204B Amendment 2, Feb. 26, 1971, Type III, Grade A. One such preferred solution is sold by Engelhard Minerals and Chemical Corporation, New York, N.Y., as the ECF-61 cyanide free Gold Plating Process.

Other gold plating solutions well known in the art can also be used with the process of the present invention. The present invention does not rely primarily on the type of plating solution used, but depends for its efficiency on gold metal being plated out onto only the surface of the cathode terminal in contact with the plating solution.

After each of the steps of cleaning, activating and plating, the cell is preferably washed with water in one or more steps. The washing removes any solution adhering to the cell and prevents the contamination of the subsequent solution or material by the preceeding one.

Subsequent to plating and the final washing procedure, any water adhering to the cell is preferably removed. Adhering water can corrode and mar the exterior of the cell. Water can be removed by air drying or by contacting the cell with a dewatering fluid.

Dewatering fluids are well known in the art, with many being based on organic solvents. A preferred dewatering fluid is sold by Burmah-Castrol Incorporated, Edison, N.J., under the trademark Rustilo WD954 (sold in Europe under the trademark Rustilo DWX10).

The cell can also be contacted with a corrosion inhibitor, which is preferably admixed with the dewatering fluid. The corrosion inhibitor deposits a thin film of material onto the exterior surface of the cell. The film prevents corrosion of the exterior of the cell after manufacture, but being very thin, on the order of less than one micron, does not interfere with the formation of a good electrical contact with the cell.

Corrosion inhibitors are well known in the art, comprising one or more organic oils, silicone oils, organic esters or other organic compounds which are capable of forming thin, adherent films. The preferred inhibitors adhere well to metals and maintain their adhesion for long periods of time under many environmental situations. A preferred corrosion inhibitor is sold by Burmah-Castrol Incorporated, Edison, N.J., under the trademark Rustilo-DW924 (in Europe, under Rustilo-DWX30).

Even though the process of the preferred embodiments is described in terms of plating gold onto the negative or cathode terminal surface of a cell, the present invention is not limited to the plating of gold. Other metals which can also be electroplated from a solution onto a metal surface, are within the scope of the present invention. Such other metals include, but are not limited to, silver, copper, cadmium, cobalt, chromium, platinum, palladium and tin.

The following Examples are given to illustrate the process of the present invention.

EXAMPLE 1

A cell having a mercuric oxide cathode, a zinc anode, an alkaline electrolyte, and anode and cathode terminals is conventionally manufactured. The anode terminal is nickel plated steel which also forms part of the cell can. The cathode terminal is nickel plated steel and in combination with an insulative grommet seals the cell can. The manufactured cell is immersed in an ultrasonic cleaning tank, having a conventional emulsifiable solvent cleaner therein. After cleaning, the solvent cleaner is washed off with a water spray. Subsequent to washing, the cell is immersed for one minute in an activating solution. The solution is comprised of 300 grams of potassium carbonate per liter of solution, with a small quantity of added wetting agent. The solution is maintained at a temperature of about 50° Celsius. This solution removes most foreign materials and oxides from the surface of the cathode terminal.

The cell is removed from the activating solution and any solution adhering to the cell is removed by washing with water. The cell is then immersed in the gold plating solution, which is at a temperature of about 45° Celsius, for about 1 minute. The gold plating solution contains about 2 grams per liter of gold metal and is comprised of the sulfite complex of gold. The solution is kept at a pH of between about 8.5 and 11. A small quantity of a brightener, well known in the art, is also added to the plating solution.

If the cell is active, gold plates out in the desired thickness onto the exposed portions of the surface of the cathode terminal. After plating, the cell is placed into a water filled tank to wash off any adhering plating solution. Waste gold is subsequently recovered from this rinse water. The cell is then washed in running water and any water adhering to the cell after washing is removed by immersing the cell in a dewatering fluid containing a corrosion inhibitor.

After dewatering, the cell is removed from the dewatering solution and air dried for about 30 minutes. The volatile solvents evaporate, leaving a thin adherent film of corrosion inhibitor on the surface of the cell which imparts corrosion resistance to the surface of the cathode terminal.

EXAMPLE 2

A cell having a manganese dioxide cathode, a lithium anode, an organic electrolyte, an anode terminal and a cathode terminal is conventionally manufactured. The exposed surface of the cathode terminal is satisfactorially gold plated using the process of claim 1.

EXAMPLES 3-7

Cells are conventionally manufactured and plated with the procedures described in Example 1, but using copper, cadmium, chromium, nickel and silver ions, respectively, in the plating solution. The exposed surface of the cathode terminal of all active cells is satisfactorily metal plated.

It will be clear to one skilled in the art that the process described and claimed herein is also useful as a quality control procedure since an inactive or poor cell will not self-discharge adequately to develop a proper coating, and therefore provides a visual indication of each cell's potential.

It is understood that the invention which has been described in terms of the preferred process and in the Examples, is not limited to that disclosed therein. Other embodiments of the process disclosed herein as well as variations of the preferred process are also within the scope of the invention as claimed in the following claims.

What is claimed is:

1. A process for making a sealed electrochemical cell with a cathode terminal having a metal plated solely on the external exposed surface thereof with the remaining surface portion thereof being within the cell, unexposed, and unplated, comprising the steps of assembling said cell using an unplated cathode terminal; thereafter immersing the electrochemical cell in an aqueous metal plating solution containing metal ions, whereby said cell is in direct contact with said plating solution; permitting said cell to remain in contact with said plating solution for a time sufficient to permit the cell's electrical output to cause metal ions to deposit as a film on the entire exposed surface of said cathode terminal of said cell; and removing said cell from said plating solution, whereby said cell has a metal plated solely on the external exposed surface of said cathode terminal.

2. The process of claim 1 and further comprising the step of contacting the cathode terminal with means for activating the exposed surface of the cathode terminal prior to the step of contacting the cathode terminal with the plating solution.

3. The process of claim 2 wherein the means for activating the exposed surface of the cathode terminal comprises an activating solution comprising hydroxide ions assisted by the electrical energy of the cell.

4. The process of claim 3 wherein the activating solution further comprises a wetting agent.

5. The process of claim 1 wherein the metal comprises gold.

6. The process of claim 5 wherein the plating solution comprises an aqueous solution of a sulfite complex of gold.

7. The process of claim 1 and further comprising the step of ultrasonically cleaning the exposed surface of the cathode terminal of the cell prior to contacting the exposed surface of the cathode terminal with the plating solution.

8. The process of claim 1 and further comprising the step of applying a film of corrosion inhibitor to the exposed cathode surface by contacting the exposed cathode surface with a solution comprising a dewatering fluid and a corrosion inhibitor film forming fluid.

9. The process of claim 1 wherein substantially all of the exposed surface of the cathode terminal is plated with a substantially continuous metal layer.

10. A process for gold plating an exposed surface of a cathode terminal of an electrochemical cell comprising the steps of ultrasonically cleaning the exposed portions of the surface of the cathode terminal of the cell, activating the exposed portions of the surface of the cathode terminal by contacting it with an aqueous solution comprising hydroxide ions, immersing the cell in an aqueous metal plating solution comprising a sulfite complex of gold and water, and contacting the cell with a dewatering and corrosion inhibitor mixture.

* * * * *